United States Patent [19]

Mondares

[11] Patent Number: 5,349,775
[45] Date of Patent: Sep. 27, 1994

[54] ADJUSTABLE GROUND-INSERTED FISHING ROD HOLDER

[76] Inventor: Valentino G. Mondares, 361 Avalon Cir., Vallejo, Calif. 94589

[21] Appl. No.: 115,592

[22] Filed: Sep. 3, 1993

[51] Int. Cl.$^5$ ............................................. A01K 97/10
[52] U.S. Cl. ..................... 43/21.2; 248/530; 248/125
[58] Field of Search ................ 43/21.2; 248/156, 530, 248/125

[56] References Cited

U.S. PATENT DOCUMENTS

| 606,558 | 6/1898 | Ketchum | 248/156 |
|---|---|---|---|
| 1,654,876 | 1/1928 | Hemming | 43/21.2 |
| 2,160,499 | 5/1939 | Goeb | 43/21.2 |
| 2,438,388 | 3/1948 | Dolk | 43/21.2 |
| 2,603,900 | 7/1952 | Kellett | 248/156 |
| 3,115,722 | 12/1963 | Mann | 43/21.2 |
| 3,198,465 | 8/1965 | Sutton | 248/156 |
| 4,510,709 | 4/1985 | Melcher | 43/21.2 |
| 4,603,499 | 8/1986 | Simborski | 43/21.2 |

FOREIGN PATENT DOCUMENTS

| 1062812 | 4/1954 | France | 43/21.2 |
|---|---|---|---|

*Primary Examiner*—P. Austin Bradley
*Assistant Examiner*—James Miner
*Attorney, Agent, or Firm*—Gary Alan Culliss

[57] ABSTRACT

An adjustable ground-inserted fishing rod holder for supporting a fishing rod at a desired angle. The holder includes a stake which may be inserted into a ground surface at the desired angle. A pair of supports are coupled to the stake and may be adjusted to accommodate fishing rods of various lengths. Measurement indicia is provided on a side of the stake and an alternate embodiment includes an oscillator assembly for selectively oscillating an associated fishing pole. A foot engagement element is coupled to the stake so as to aid insertion of the stake into the ground.

2 Claims, 4 Drawing Sheets

ADJUSTABLE GROUND-INSERTED FISHING ROD HOLDER

BACKGROUND OF THE INVENTION

1. Field of the Invention

The present invention relates to fishing rod holders and more particularly pertains to an adjustable ground-inserted fishing rod holder for supporting a fishing rod at a desired angle.

2. Description of the Prior Art

The use of fishing rod holders is known in the prior art. More specifically, fishing rod holders heretofore devised and utilized for the purpose of supporting fishing equipment are known to consist basically of familiar, expected and obvious structural configurations, notwithstanding the myriad of designs encompassed by the crowded prior art which have been developed for the fulfillment of countless objectives and requirements.

For example, a fishing rod holder extension is illustrated in U.S. Pat. No. 4,876,980 in which a generally Z-shaped tubular member is provided including a pair of laterally and longitudinally offset parallel legs interconnected by an angulated arm extending between an interconnecting adjacent ends of the legs. One of the legs is downwardly receivable in an upwardly opening, inclined fishing rod holder on a boat gunnel and the handle end of a fishing rod is removably and downwardly receivable in the other leg.

A pistol grip fishing pole stand is disclosed in U.S. Pat. No. 5,016,384 which includes a frame means that is designed to be inserted into the ground to provide support for the pistol grip fishing pole stand. The stand also includes a receptacle therewith which is adapted to receive and engage a pistol grip shaped handle of a fishing pole. The device is custom designed to accept fishing poles having the pistol grip style of handle.

Another patent of interest is U.S. Pat. No. 4,972,621 which describes a fishing rod support for supporting a fishing rod in an inclined upright position suitable for attracting and catching fish. The support includes a balancing post that can assume an operating position contacting the ground surface or, alternatively, a storage position extending along the under surface of the fishing rod.

While these devices fulfill their respective, particular objectives and requirements, the aforementioned patents do not disclose an adjustable fishing rod holder for supporting a fishing rod at a desired angle which includes a stake that may be inserted into a ground surface and a pair of supports coupled to the stake operable to accommodate fishing rods of various lengths. Furthermore none of the known prior art fishing rod holders include measurement indicia for measuring a length of a fish or an oscillator assembly for selectively oscillating an associated fishing pole.

In these respects, the adjustable ground-inserted fishing rod holder according to the present invention substantially departs from the conventional concepts and designs of the prior art, and in so doing provides an apparatus primarily developed for the purpose of supporting a fishing rod at a desired angle and providing a convenient means for measuring captured fish.

SUMMARY OF THE INVENTION

In view of the foregoing disadvantages inherent in the known types of fishing rod holders now present in the prior art, the present invention provides a new adjustable ground-inserted fishing rod holder construction wherein the same can be utilized for supporting a fishing rod at a desired angle. As such, the general purpose of the present invention, which will be described subsequently in greater detail, is to provide a new adjustable ground-inserted fishing rod holder apparatus which has many of the advantages of the fishing rod holders mentioned heretofore and many novel features that result in a adjustable ground-inserted fishing rod holder which is not anticipated, rendered obvious, suggested, or even implied by any of the prior art fishing rod holders, either alone or in any combination thereof.

To attain this, the present invention essentially comprises an adjustable ground-inserted fishing rod holder for supporting a fishing rod at a desired angle. The holder includes a stake which may be inserted into a ground surface at the desired angle. A pair of supports are coupled to the stake and may be adjusted to accommodate fishing rods of various lengths. Measurement indicia is provided on a side of the stake and an alternate embodiment includes an oscillator assembly for selectively oscillating an associated fishing pole.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new adjustable ground-inserted fishing rod holder apparatus which has many of the advantages of the fishing rod holders mentioned heretofore and many novel features that result in a adjustable ground-inserted fishing rod holder which is not anticipated, rendered obvious, suggested, or even implied by any of the prior art fishing rod holders, either alone or in any combination thereof.

It is another object of the present invention to provide a new adjustable ground-inserted fishing rod holder which may be easily and efficiently manufactured and marketed.

It is a further object of the present invention to provide a new adjustable ground-inserted fishing rod holder which is of a durable and reliable construction.

An even further object of the present invention is to provide a new adjustable ground-inserted fishing rod holder which is susceptible of a low cost of manufacture with regard to both materials and labor, and which accordingly is then susceptible of low prices of sale to the consuming public, thereby making such adjustable ground-inserted fishing rod holders economically available to the buying public.

Still yet another object of the present invention is to provide a new adjustable ground-inserted fishing rod holder which provides in the apparatuses and methods of the prior art some of the advantages thereof, while simultaneously overcoming some of the disadvantages normally associated therewith.

Still another object of the present invention is to provide a new adjustable ground-inserted fishing rod holder for supporting a fishing rod at a desired angle.

Yet another object of the present invention is to provide a new adjustable ground-inserted fishing rod holder which includes a stake that may be inserted into a ground surface at a desired angle and a pair of supports coupled to the stake capable of adjustment so as to accommodate fishing rods of various lengths.

Even still another object of the present invention is to provide a new adjustable ground-inserted fishing rod holder which includes measurement indicia for providing a convenient means of measuring captured fish.

Even still yet another object of the present invention is to provide a new adjustable ground-inserted fishing rod holder which includes an oscillator assembly for selectively oscillating an associated fishing pole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
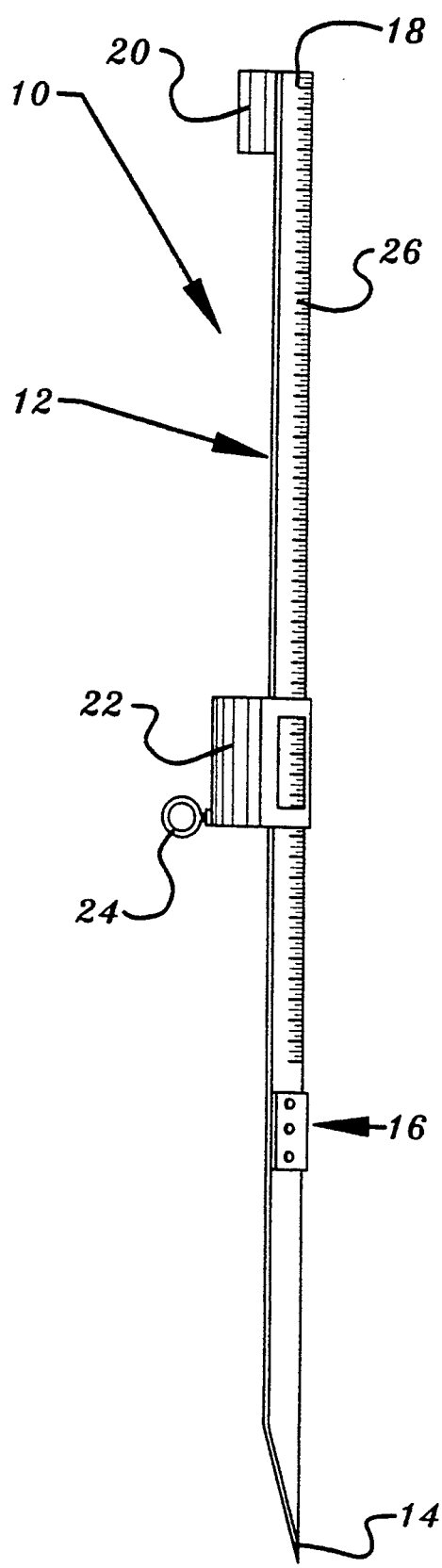
FIG. 1 is a side elevation view of an adjustable ground-inserted fishing rod holder comprising the present invention.

With reference now to the drawings, and in particular to FIGS. 1-6 thereof, a first embodiment of a new adjustable ground-inserted fishing rod holder embodying the principles and concepts of the present invention and generally designated by the reference numeral 10 will be described.

The adjustable fishing rod holder 10 comprises a stake 12 which may be inserted into a ground surface at any desired angle. The stake 12 is provided with both a pointed tip 14 and a foot engagement member 16 which cooperate to facilitate an easy insertion of the stake into the ground surface. Fixedly secured to an upper end 18 of the stake 12 is an upper support 20. A lower support 22 is slidably coupled to the stake 12 and may be secured in various positions along the stake's longitudinal length by a securing fastener 24 which engages the stake. The lower support 22 is operable to receive a portion of a handle of an unillustrated fishing pole, whereby a remaining portion of the handle may engage the upper support 20. By this structure, the fishing pole may be positioned at any desired angle and held at such an angle thereby.

Measurement indicia 26 is provided along the stake's longitudinal length and may be utilized to provide a convenient means of measuring a captured fish. The measurement indicia 26 may be labeled in either Metric or English increments, or both Metric and English markings may be included.

In use, the stake may be inserted into the ground surface by applying a force to the foot engagement mender 16 in a now apparent manner, thereby forcing the pointed tip 14 to pierce the ground surface and enter the same. The lower support 22 may then be adjusted into an appropriate spaced relationship to the upper support 20, whereby the handle of the fishing pole may be inserted into the lower support and engaged to the upper support. The adjustable ground-inserted fishing rod holder 10 provides an apparatus which supports a fishing rod at a desired angle even while unattended.

More specifically, it will be noted that the adjustable ground-inserted fishing rod holder 10 comprises a stake 12 formed from a first member 28 having a substantially flat, elongated shape which is integrally or otherwise joined along a longitudinal edge thereof with a substantially identically shaped second member 30 to define a right angle therebetween. This arrangement allows the stake 12 to be made of a light-weight material while still providing substantial rigidity therein. Although the preferred embodiment comprises a right angle between the first member 28 and the second member 30, the members may be joined together at any desired angle. The first and second members 28, 30 each include a tapered edge which cooperate to define the pointed tip 14.

Figure 2:
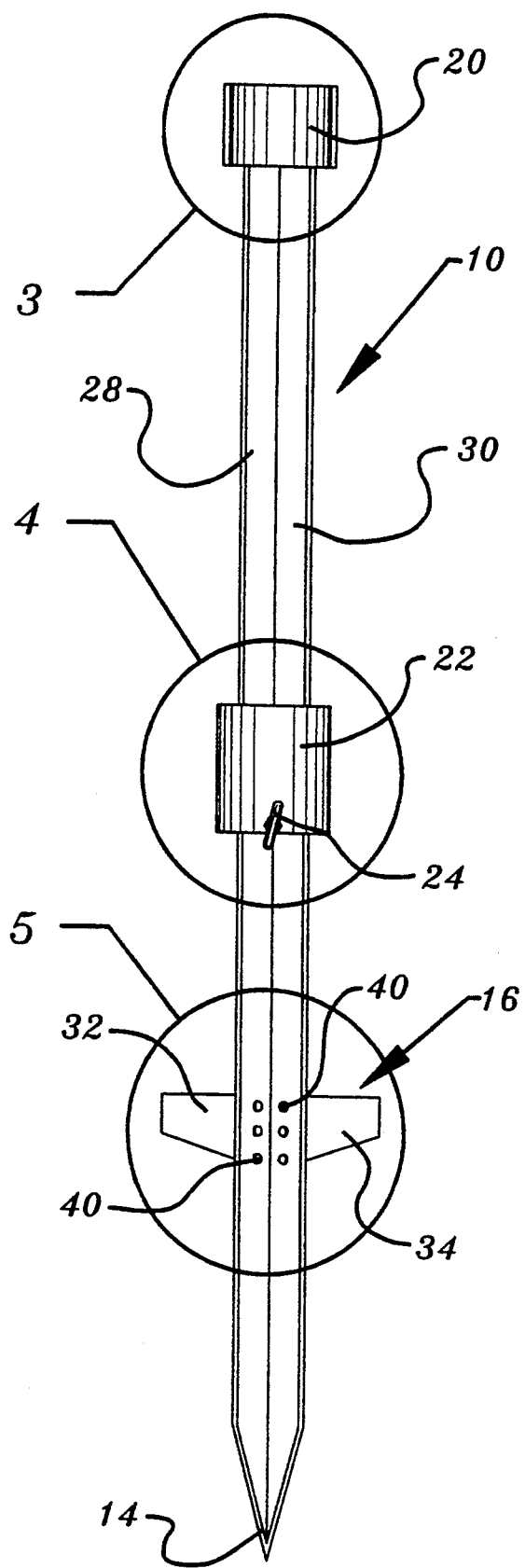
FIG. 2 is a front elevation view of the present invention.
Figure 5:
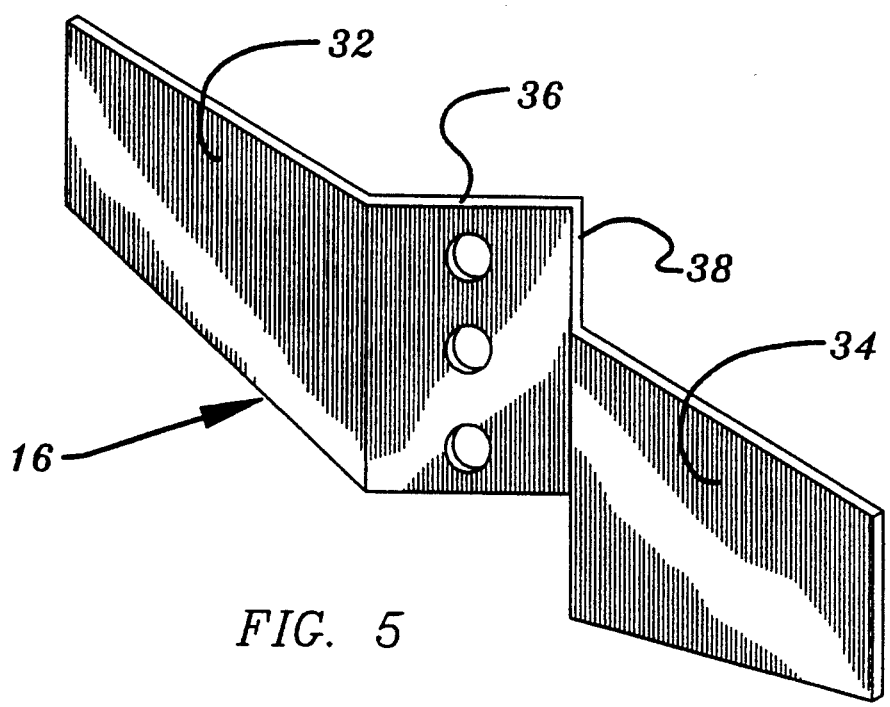
FIG. 5 is an even further perspective view of an even further portion of the invention as indicated by an even further circled area of FIG. 2.

To facilitate an insertion of the stake 12 into the ground surface, a foot engagement member 16 is provided. As best illustrated in FIGS. 2 and 5, the foot engagement 16 comprises a first wing 32 and a second wing 34 which are integrally or otherwise secured to a first member mount 36 and a second member mount 38, respectively. The first and second member mounts 36, 38 are joined together to define an angle substantially identical to that as defined between the first member 28 and the second member 30 of the stake 12. In addition, the first and second member mounts 36, 38 are both provided with unlabeled apertures which allow fasteners 40 to secure the foot engagement member 16 to the stake 12, as best illustrated in FIG. 2. The first and second wings 32, 34 of the foot engagement member 16 are operable to be received beneath the foot of a user, whereby substantial pressure may be applied to the engagement member 16, thereby forcing the stake 12 into the ground surface.

Figure 4:
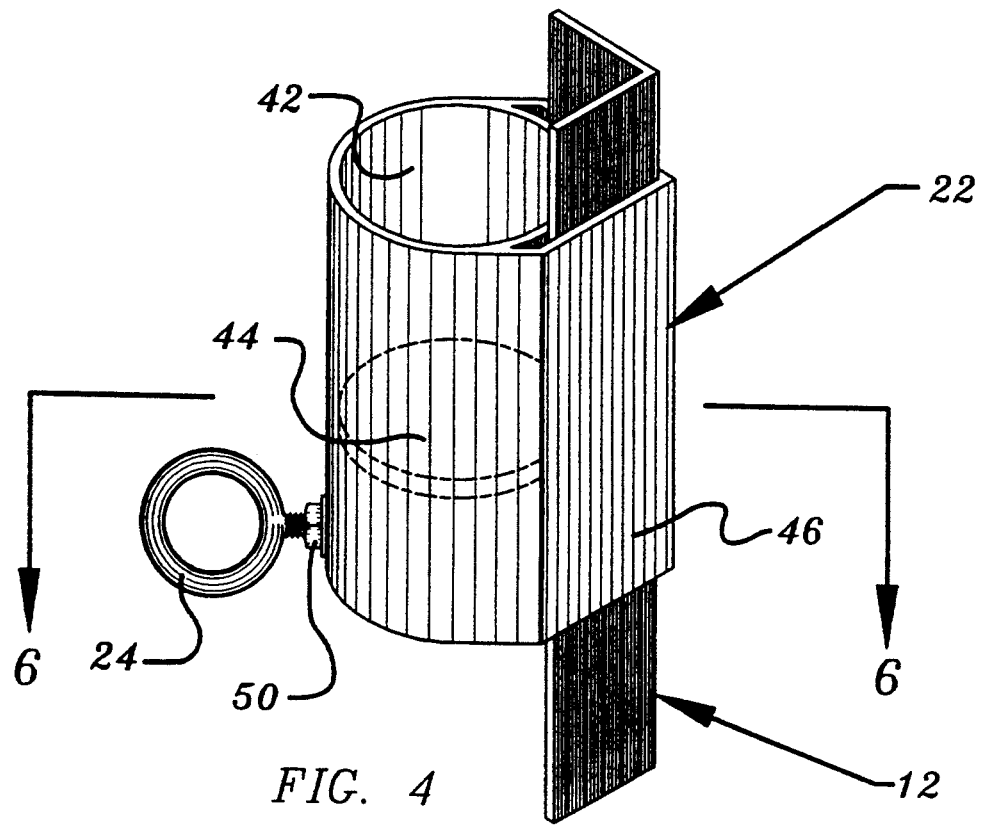
FIG. 4 is a further perspective view of a further portion of the invention as indicated by a further circled area of FIG. 2.
Figure 6:
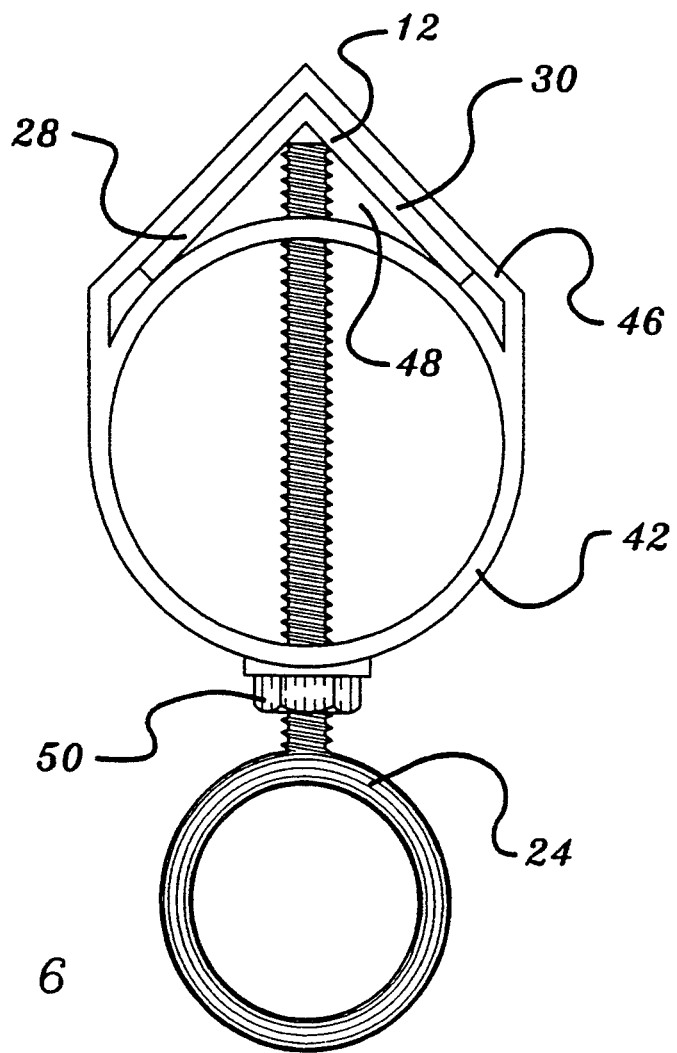
FIG. 6 is a cross sectional view taken along line 6—6 of FIG. 4.

A lower support 22 is slidably received upon the stake 12 and may be secured at a particular longitudinal position along the stake by a securing fastener 24 which engages the same. As best illustrated in FIG. 4, it can be shown that the lower support 22 comprises a substantially cylindrical member 42 defining an unlabeled hollow interior. An interior stop 44 is position within the hollow interior of the cylindrical member 42 and is operable to preclude a handle of a fishing rod from passing therethrough. Integrally or otherwise secured to the cylindrical member 42 is an angled member 46 which defines an angled aperture 48 therebetween. The angled aperture 48 is operable to allow the stake 12 to pass therethrough, thereby slidably coupling the lower support 22 to the stake, as best illustrated in FIG. 6.

Fixedly secured to the cylindrical member 42 and positioned over an unlabeled aperture therethrough is a nut 50 which is operable to threadably receive the securing fastener 24 in a well understood manner. The securing fastener 24 includes an unlabeled threaded shaft which passes through the cylindrical member 42 and engages a center apex of the stake 12 defined by an intersection of the first member 28 and the second member 30. The securing fastener 24 is operable to secure a position of the lower support 22 along the longitudinal length of the stake 12.

Figure 3:
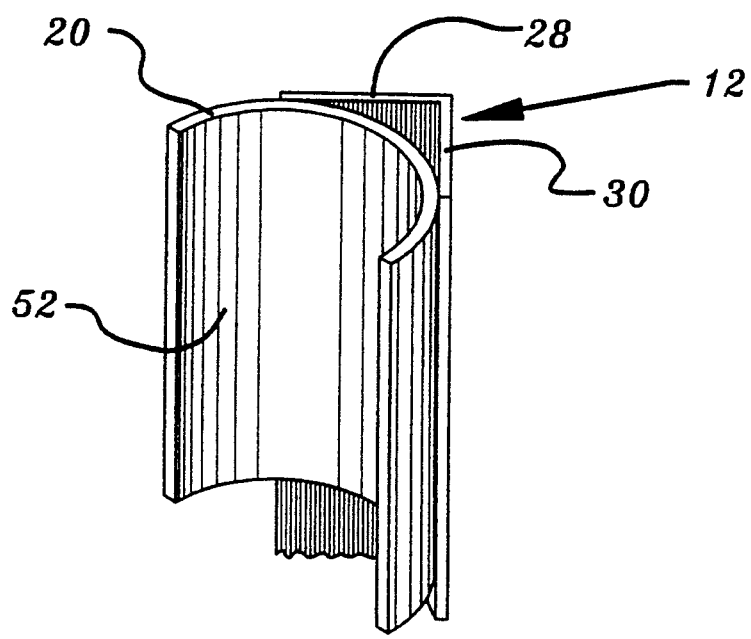
FIG. 3 is a perspective view of a portion of the present invention as indicated by the circled area of FIG. 2.

Positioned at an upper end 18 of the stake 12 is the upper support 20 which is best illustrated in FIG. 3. From this Figure, it can be shown that the upper support 20 comprises a semi-cylindrical member 52 which is secured to the stake 12 at the free longitudinal sides of the first and second members 28, 30. Suitable fastening means include welding, braising, or other mechanical fasteners such as rivets, screws and the like.

The adjustable ground-inserted fishing rod holder 10 is preferably comprised of a light-weight material which allows the device to be easily carried by a user. In the preferred embodiment the holder 10 is comprised of aluminum components which provide the aforementioned feature. However, any material may be utilized to construct the fishing rod holder 10, including plastics, composites, or other metal alloys.

In use, the stake may be inserted into the ground surface by applying a force to the foot engagement member 16, thereby forcing the pointed tip 14 to pierce the ground surface and enter the same. The lower support 22 may then be adjusted into an appropriate spaced relationship to the upper support 20 whereby the handle of the fishing pole may be inserted into the lower support and engaged to the upper support. The adjustable ground-inserted fishing rod holder 10 provides an apparatus which supports a fishing rod at a desired angle even while unattended.

Figures 7, 8:
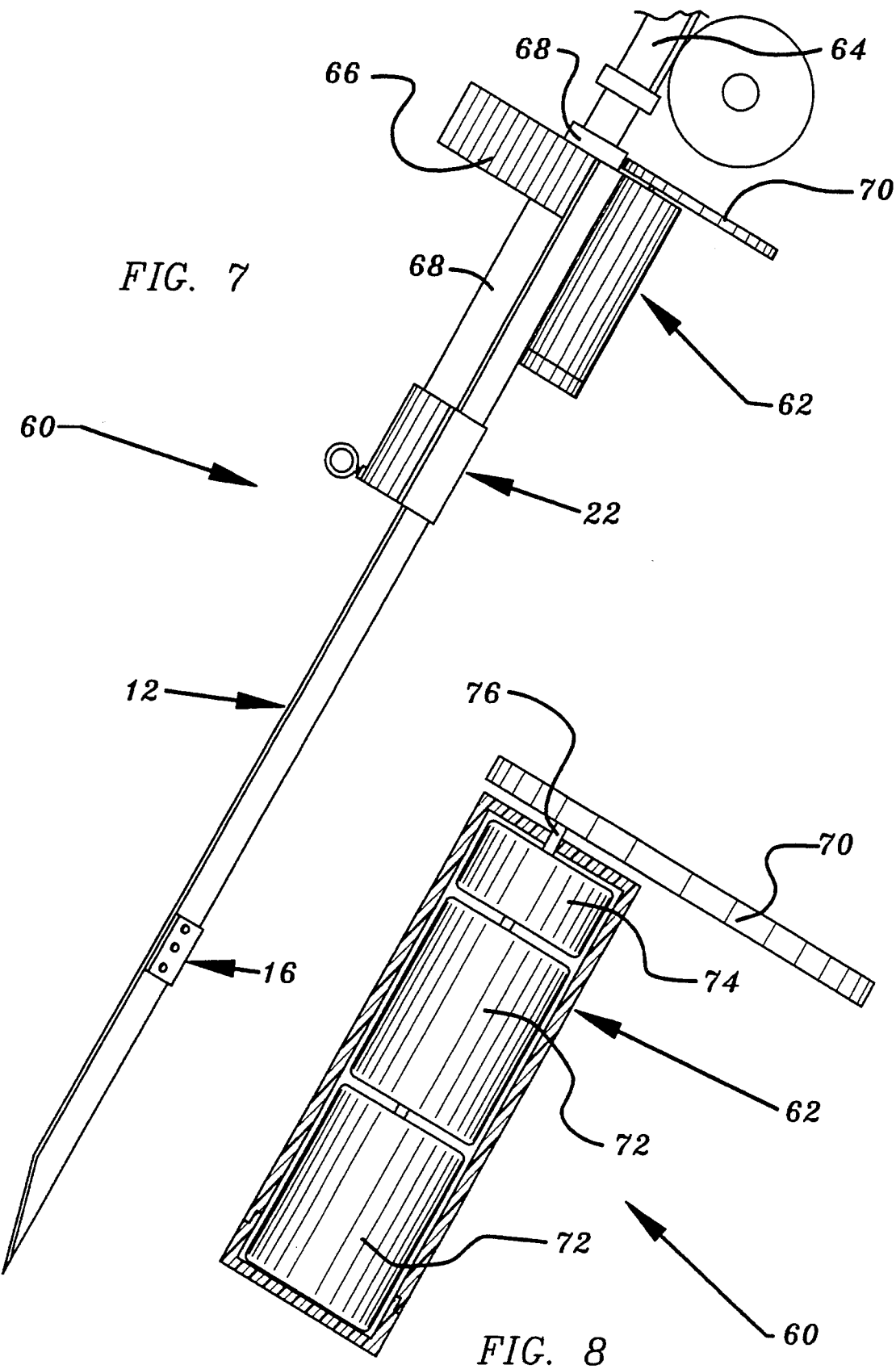
FIG. 7 is a side elevation view of a second embodiment of an adjustable ground-inserted fishing rod holder comprising the present invention.
FIG. 8 is an enlarged side elevation view, partially in cross section, of a portion of the second embodiment.

A second embodiment of the present invention as generally designated by the reference numeral 60 which comprises substantially all of the features of the foregoing embodiment 10 and which further comprises an oscillator assembly 62 will now be described. As best shown in FIGS. 7-8, it can be shown that the oscillator assembly 62 is operable to selectively oscillate an associated fishing rod 64. The oscillator assembly 62 includes an elongated upper support 66 which allows a fishing rod handle 68 of the fishing rod 64 to move away from the stake 12 within the confines of the elongated upper support, whereby a motor cam 70 may engage the fishing rod handle to provide such a movement.

FIG. 8 details an interior of the oscillator assembly 62 and it can be seen from this Figure that a pair of batteries 72 provide electrical power to a motor 74 having a motor shaft 76 which is eccentrically connected to the motor cam 70. As the motor shaft 76 rotates, the motor cam 70 will engage the fishing rod handle 68 to create a repetitive oscillatory motion of the fishing rod 64 with respect to the stake 12. The oscillatory motion is effectively transmitted to a distal lure to create a fish attracting motion.

As to further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable ground-inserted fishing rod holder for use with a fishing rod having a handle, said holder comprising:
   a stake having a pointed tip at an end thereof;
   an upper support coupled to an upper end of said stake;
   a lower support slidably disposed upon said stake, said lower support being operable to receive a portion of said handle of said fishing rod;
   a foot engaging means coupled to said stake for facilitating a forced insertion of said stake into a ground surface; and,
   measurement indicia means positioned along a longitudinal length of said stake for measuring a captured fish;

wherein said lower support comprises a substantially hollow cylindrical member; an interior stop positioned upon an interior surface of said cylindrical member; an angled member coupled to said cylindrical member in a manner so as to define an angled aperture therethrough operable to receive said stake; a nut fixedly secured to said cylindrical member; and a securing fastener threadably engaged to said nut and operable to be selectively engaged to said stake to secure a position of said lower support along a longitudinal length of said stake;

wherein said upper support comprises a semi-cylindrical member secured to said stake;

wherein said stake comprises an elongated first member integrally coupled an elongated second member along longitudinal edges thereof to define an angle therebetween;

wherein said foot engaging means comprises a first member mount joined at an edge thereof to an edge of a second member mount to form said angle therebetween; a first wing jointed at an edge thereof to a further edge of said first member mount; a second wing joined at an edge thereof to a further edge of said second member mount, wherein said first wing and said second wing lie in a plane.

2. An adjustable ground-inserted fishing rod holder for use with a fishing rod having a handle, said holder comprising:

a stake having a pointed tip at an end thereof;

an upper support coupled to an upper end of said stake;

a lower support slidably disposed upon said stake, said lower support being operable to receive a portion of said handle of said fishing rod;

a foot engaging means coupled to said stake for facilitating a forced insertion of said stake into a ground surface;

an oscillating means for oscillating said fishing rod; and, measurement indicia means positioned along a longitudinal length of said stake for measuring a captured fish;

wherein said lower support comprises a substantially hollow cylindrical member; an interior stop positioned upon an interior surface of said cylindrical member; an angled member coupled to said cylindrical member in a manner so as to define an angled aperture therethrough operable to receive said stake; a nut fixedly secured to said cylindrical member; and a securing fastener threadably engaged to said nut and operable to be selectively engaged to said stake to secure a position of said lower support along a longitudinal length of said stake;

wherein said upper support comprises a semi-cylindrical member secured to said stake;

wherein said stake comprises an elongated first member integrally coupled an elongated second member along longitudinal edges thereof to define an angle therebetween;

wherein said foot engaging means comprises a first member mount joined at an edge thereof to an edge of a second member mount at said angle; a first wing joined at an edge thereof to a further edge of said first member mount; a second wing joined at an edge thereof to a further edge of said second member mount, wherein said first wing and second wing lie in a plane.

* * * * *